J. T. FENTON.
SULPHUR EXTRACTION.
APPLICATION FILED FEB. 9, 1921.
1,409,338.
Patented Mar. 14, 1922.
4 SHEETS—SHEET 1.
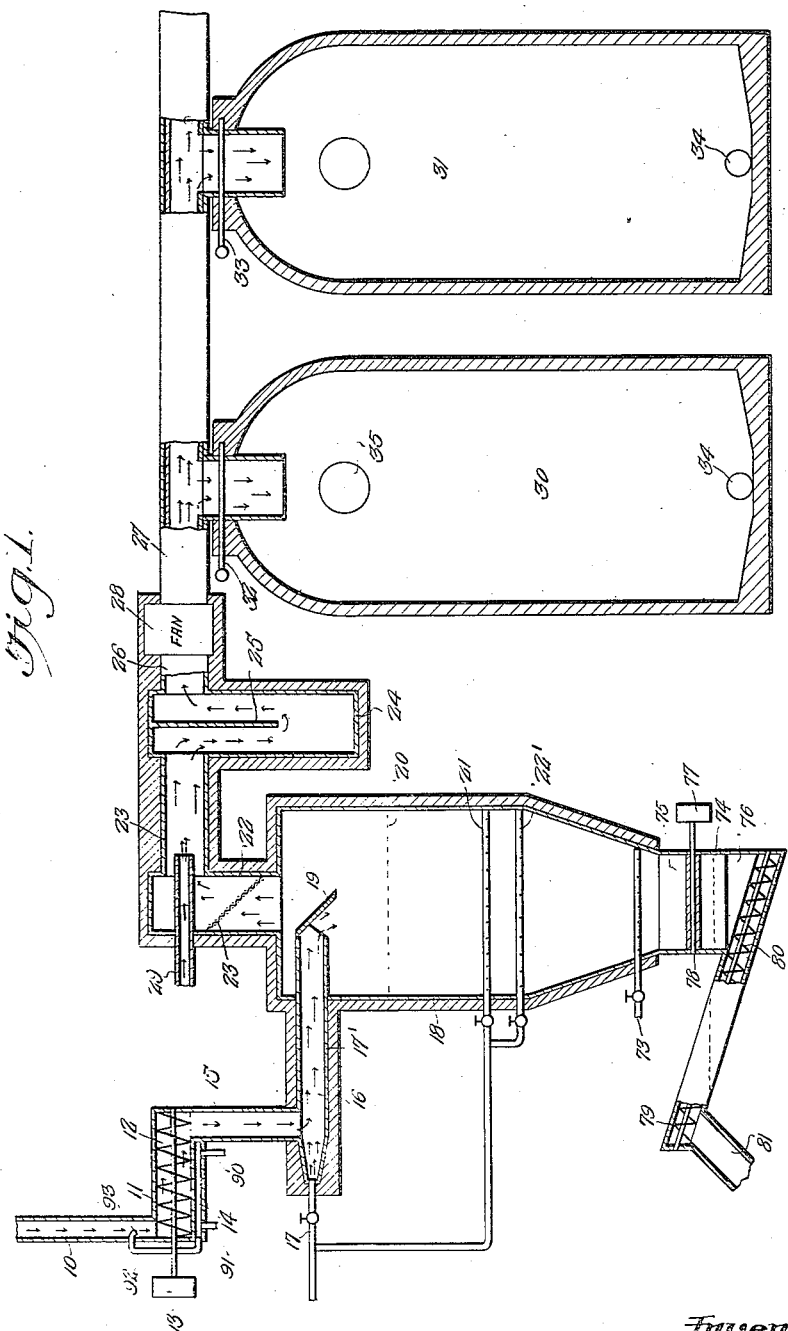
Inventor
James T. Fenton
by his Attorneys
Baldwin Wight J. T. FENTON.
SULPHUR EXTRACTION.
APPLICATION FILED FEB. 9, 1921.
1,409,338.
Patented Mar. 14, 1922.
4 SHEETS—SHEET 2.
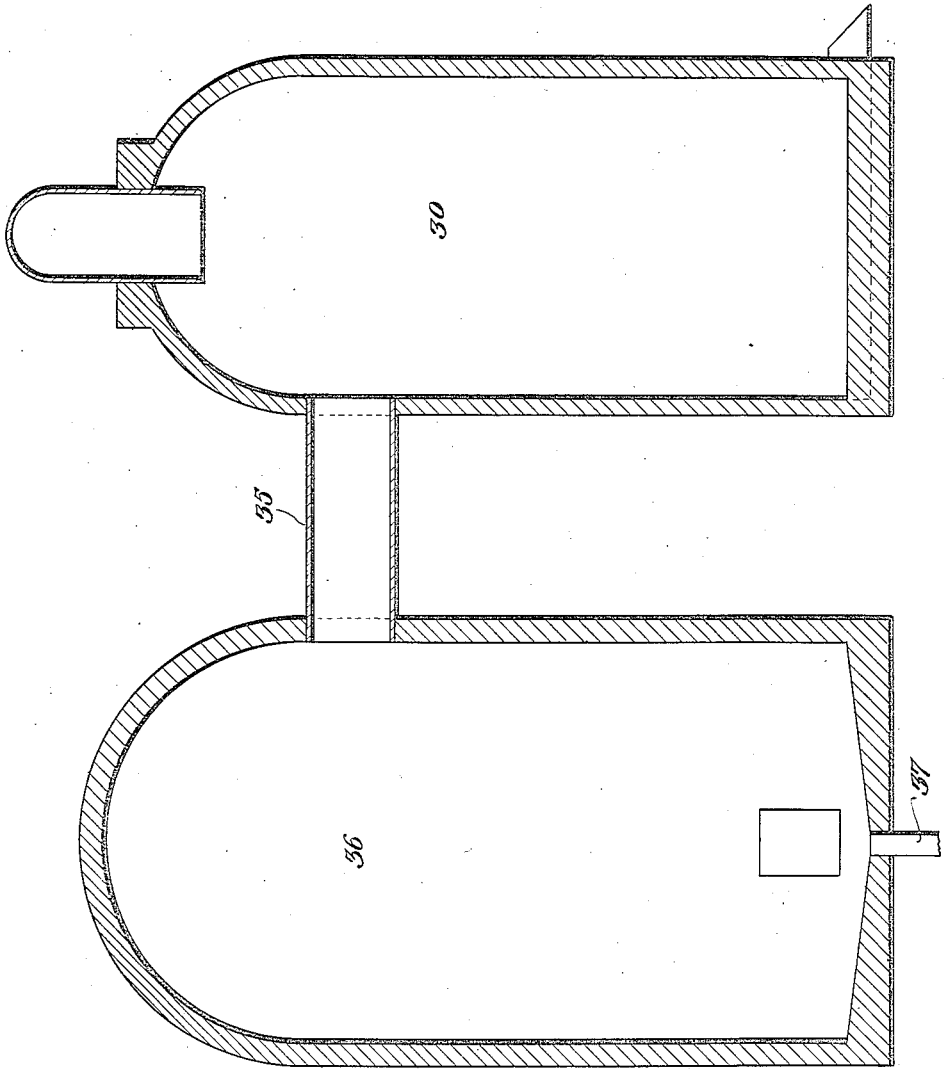
Inventor
James T. Fenton
by his Attorneys

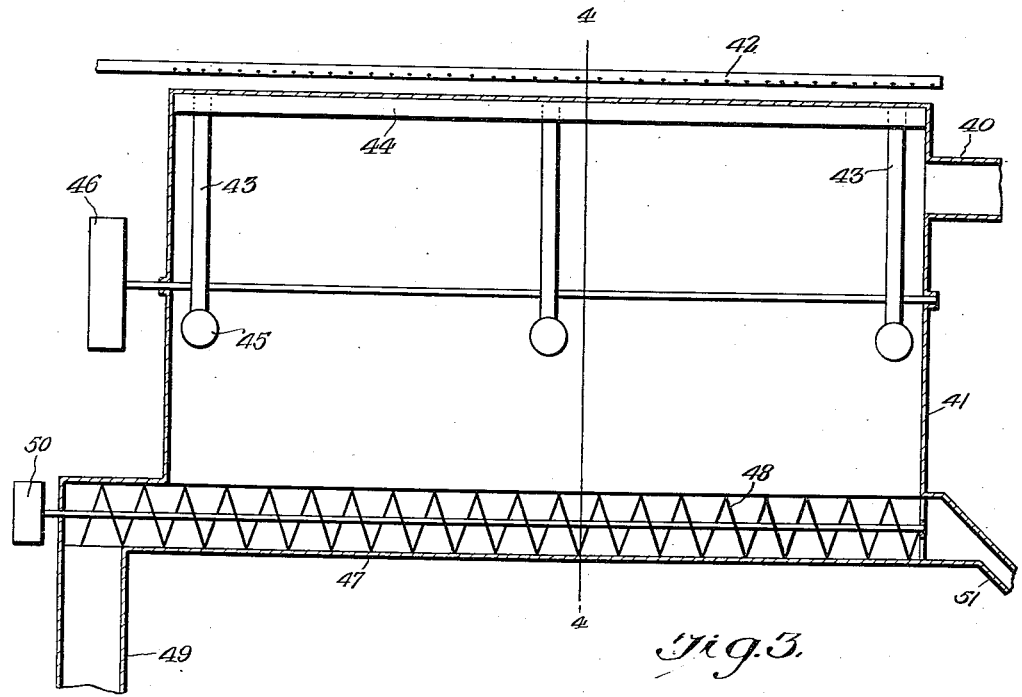
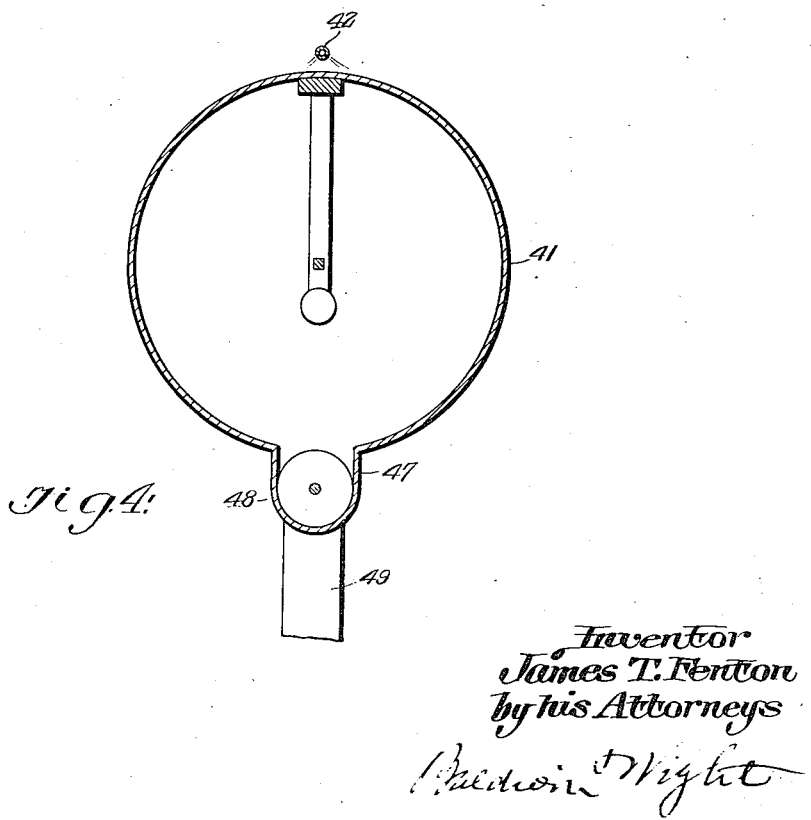

J. T. FENTON.
SULPHUR EXTRACTION.
APPLICATION FILED FEB. 9, 1921.
1,409,338.
Patented Mar. 14, 1922.
4 SHEETS—SHEET 4.
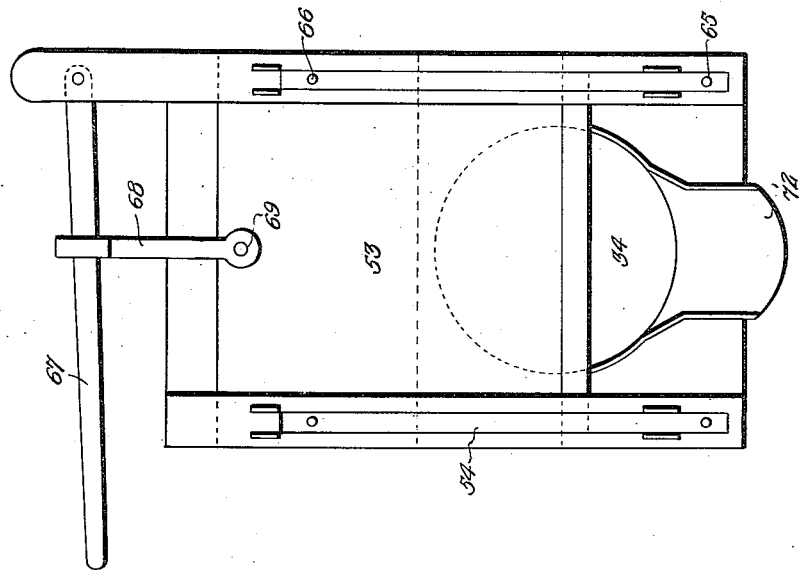
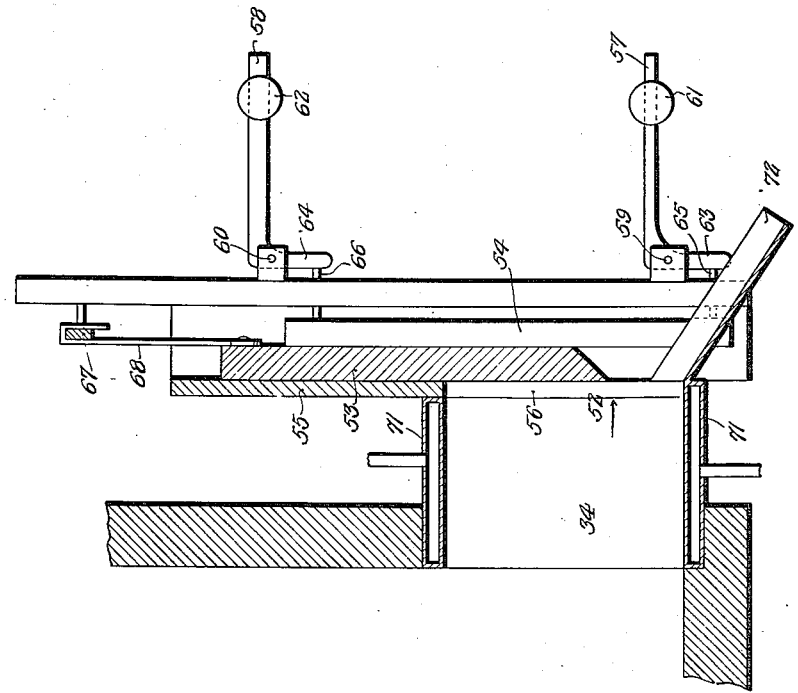
Inventor
James T. Fenton
by his Attorneys

UNITED STATES PATENT OFFICE.

JAMES T. FENTON, OF SALT LAKE CITY, UTAH.

SULPHUR EXTRACTION.

1,409,338.  Specification of Letters Patent.  Patented Mar. 14, 1922.

Application filed February 9, 1921. Serial No. 443,614.

*To all whom it may concern:*

Be it known that I, JAMES T. FENTON, a citizen of the United States, residing at Salt Lake City, in the county of Salt Lake and State of Utah, have invented certain new and useful Improvements in Sulphur Extraction, of which the following is a specification.

The present invention relates to a novel method and apparatus for extracting sulphur from sulphur ores or sulphur earths in which the sulphur originally appears in the elemental condition, and the object of the invention is to simplify and cheapen the production and recovery of elemental sulphur, from material of the character above stated. The process and apparatus may, of course, also be employed in the treatment of other materials, such as by-products of chemical processes in which free sulphur occurs in substantial quantities.

For the purpose of illustration, the annexed drawings forming a part of this specification show certain forms of apparatus which may be employed in carrying out the process, although it is understood that the invention is not restricted to the employment of the specific apparatus as illustrated.

In the annexed drawings Fig. 1 is a diagrammatic sectional elevation of an apparatus within the scope of the present invention which may be employed in carrying out the process.

Fig. 2 shows another method of connecting the elements of the recovery system, whereby liquid or molten sulphur may be obtained as one product and flowers of sulphur or sublimed sulphur obtained as another product.

Fig. 3 shows, in vertical section, another form of subliming apparatus, and Fig. 4 is a vertical section of the same apparatus, taken approximately on the line 4—4 of Fig. 3, showing the means preferably employed for removing the sublimed sulphur from the walls of the subliming apparatus.

Figs. 5 and 6 show, respectively, a side view (partly in section), and an end view, respectively, of an outlet for molten sulphur which may conveniently be used in the present invention.

The process will now be described as applied to sulphur ore containing elemental sulphur mixed with sand, clay and the like, in connection with the apparatus as illustrated.

The sulphur ore is fed down through the vertical chute 10 into a horizontal flue 11 containing a conveying means such as the worm conveyor illustrated at 12, operated by pulley 13. Surrounding or partially surrounding the flue 11 is a jacket 14 for steam or other heating agent. From the end of the flue 11 the sulphur ore drops through vertical flue 15 into the mixing chamber 16 to which superheated steam, conveniently at a temperature around 1000° F., is supplied by pipe 17. The high pressure of the steam in the pipe 17 causes this steam to expand greatly on entering the conical end of the mixing chamber 16, to fill substantially the entire cross sectional area thereof. The pipe 17' forming a continuation of the mixing chamber 16 enters the distillation retort 18, and at the end of this chamber is positioned a baffle 19 preferably placed at an angle of about 45 degrees. The end of the pipe 17' is cut off at an angle as illustrated so that the solid material on striking the baffle, is immediately thrown down into the chamber 18. A suitable rake or rotating rabble may be positioned in the chamber 18 to serve as a leveling device, to maintain a substantially uniform level of the sulphur ore, say, at 20. The baffle 19 is preferably made removable so that the same can readily be renewed when worn out by the friction of the sand and other materials striking the same. A considerable part of the sulphur in the ore will be vaporized before the ore falls upon that accumulated in the distillation retort.

In order to more completely remove the sulphur from the ore, additional inlets for superheated steam are provided at 21 and 22', these being placed well below the normal lever of the sulphur ore in the distillation retort. The steam rising from these pipes very thoroughly removes the sulphur as sulphur vapor from the ore. The sulphur vapor, together with the excess of superheated steam, rises through the conduit 22 in which is preferably located a screen member 23 for removing from the vapors any solid matter, such as fine sand, clay and the like carried thereby. Connected to the outlet 22 is a horizontal pipe 23 leading to a separator 24. This separator may consist of a vertically elongated receptacle having a baffle plate extending downwardly therein in order to compel the gases and vapors to assume a tortuous course. The baffle is illustrated at 25. The gases and vapors from the separator pass through a horizontal flue 26—27, preferably provided with a blower 28, in order to force the gases and vapors from the vaporizer through the separator and to the condensing system to be described below. If desired, a blower 29 may also be provided to assist blower 28. From the vapor header 27, the vapor of sulphur and steam enter one or more of the condensing chambers 30—31, and suitable slide valves or gates 32—33, respectively, are placed in the passages leading from the vapor header 27 into these condensers. The condensers may be made of suitable material, such as masonry or cement and may be externally cooled. The liquid molten sulphur may be drawn off through pipes 34 in the lower part of the condensers. The bottoms of the condensing chambers are preferably not water cooled, and in fact may conveniently be steam heated in order to prevent solidification of sulphur in the bottom of these condenser chambers.

From the chamber 30 leads a vapor outlet flue 35 into a subliming chamber 36 (see Fig. 2). In this chamber the sulphur vapor which has not been condensed in the first condensers, will be condensed into the form of flowers of sulphur. Chamber 36 is suitably cooled and is provided with a liquid outlet 37 through which condensed steam flows off to a trap in which the water and sulphur are separated from each other.

Figs. 3 and 4 show a modified construction of subliming apparatus which may be used in place of the sublimer 36. The vapor of sulphur, mixed with steam, enters through the pipe or flue 40 into a sheet metal chamber 41 provided with suitable cooling means as illustrated in the horizontal pipe 42 located above this chamber. The chamber is as shown preferably located on a slope, the right-hand end being lower than the left-hand end. Maintained within the chamber 41 on a horizontal shaft, are a number of arms 43 carrying a scraper or brush 44, which periodically cleans off the entire interior cylindrical wall of the vessel or subliming chamber 41. The weight of the arms 43 and the brushes 44 is preferably counter-balanced by means of weights 45. If desired, the arms 43 could, of course, extend all the way across the diameter of the chamber with brushes provided at each end. However, it is generally advisable to employ the counter weights. The shaft is conveniently rotated by means of a pulley 46.

All of the sulphur sublimed in the chamber 41 falls into a trough 47 located in the bottom thereof, and carrying a worm conveyor or equivalent means as illustrated at 48. The conveyor moves the solid sulphur towards the left in Fig. 3 and the sulphur drops down through the chute 49 into suitable receptacles. The worm conveyor can be operated by a pulley 50. The water condensed in the chamber 41 can readily drain away and be discharged at 51, thereby automatically separating itself from the sublimed sulphur.

In Figs. 5 and 6 I have illustrated a convenient and highly efficient self cleaning sulphur valve which may be applied to the outlet of the condensers, for example at 34 in Fig. 1. The sulphur flowing in the direction of the arrow 52 passes under the beveled lower edge of the gate valve 53, which has a construction somewhat resembling a guillotine. The tension slides 54 press against the back of the gate valve 53 at both edges of the latter, thereby the gate valve 53 is pressed against the plate 55 and against the frames 56 at the edges, in order to maintain a tight joint therewith. The said pressure is produced by the arms 57—58 which are pivoted at 59 and 60, respectively, and carry weights 61 and 62, respectively, adjustable on the lengths of the lower and upper arms. The ends 63 and 64 which are made integral with 57 and 58, respectively, press against the tension pins 65 and 66, respectively, forcing the latter against the slides 54.

The gate valve 53 is normally held in fixed position by the pressure exerted by the weights 61 and 62, as above described, but this valve can be raised and lowered by raising or lowering the hand lever 67, a link 68 being attached to the lever 67, and to the pin 69 in the center of the upper part of the gate valve.

In order to prevent chilling and consequent solidification of the molten sulphur in the outlet 34 and in the passage leading therefrom to the valve, there are provided steam jackets 71, in which superheated steam is maintained for the purpose of keeping the sulphur hot. This steam, of course, need not be much above the melting point of sulphur. In place of superheated steam, any other convenient heating agent can be employed, such as strong calcium chlorid solution or hot oil.

The sulphur passing out through the open gate valve flows away through the spout 72.

The material in the retort 18, below the superheated steam inlet pipe 22, will be substantially free from sulphur, and will constitute the gangue of the ore under treatment. Water or other appropriate liquid may be introduced through the pipe 73, in such amount as to maintain the water in the bottom of the retort at about the level 74, to form a liquid seal at the bottom of said retort. At 75 is shown a rotating valve member which need not fit air-tight through which the solid material may be dropped into the bottom 76 of the retort 18. The member 75 may be rotated by means of the pulley 77 and shaft 78.

The solid material may be conveniently removed from 76 by means of the screw conveyor 79, which is located at the casing 80, the solid material being dropped out through the chute 81 to waste or to a suitable car for carrying the same away. It is to be understood, however, that in place of this form of outlet, any other convenient outlet can be employed.

For the purpose of conserving heat, the parts 16, 18, 22, 23, 24, 27 and 28 may be surrounded by suitable heat insulation, as illustrated in the drawing.

As the vehicle in which the sulfur is vaporized from the ore, I have above referred to superheated steam, as being preferred. It is to be understood that hot gases can likewise be employed, the gases obviously being such as will not react with sulphur under the existing conditions. As examples of such gases, I mention especially nitrogen, carbon dioxid or mixtures thereof. The expression "elastic fluid" embraces steam or such gases.

In certain cases, the sulphur may be completely removed from the ore by the superheated steam or gases injected at 16 into 17', and in such cases the inlets 21 and 22 may be closed.

An important feature, in some cases, consists in excluding air from the distillation retort 18, as well as from associated parts of the apparatus, since air present in quantity might burn some of the sulphur. The exclusion of air is provided for by blowing some steam into the inlet pipe 10. The steam for this purpose may be the excess of steam from the preheating jacket 14. In the apparatus shown in Fig. 1, the jacket 14 may be supplied with steam (superheated or not as desired) by pipe 90, and the condensed water (if any) may be drawn off by pipe 91, while the uncondensed steam may be led through pipe 92, into the pipe 10, this pipe 92 terminating in the downward bend 93. Steam admitted in this manner will force out the air between the particles of sulphur ore, so that very little or no air will be taken with the sulphur ore into the casing 11 of the worm conveyor 12.

This feature is of importance not only in the treatment of sulphur ore but of other solids containing readily combustible or oxidizable substances, e. g., shale, oil sands, etc.

It will accordingly be seen that the introduction of the waste steam, into the tube 10, prevents the blower system from sucking in air into the retort or distillation chamber, thereby making in effect an air-tight feed system, without the complication of gates, doors, valves, etc. This steam, also, incidentally imparts some heat to the incoming material.

I claim:

1. A process of separating sulphur from ore which comprises injecting sulphur ore, in a comminuted state, into a vaporization receptacle, by a current of hot elastic fluid at above the boiling point of sulphur, and leading away the sulphur vapor and hot elastic fluid to a cooling system.

2. A process of separating sulphur from ore which comprises injecting sulphur ore, in a comminuted state, into a vaporization receptacle, by a current of hot elastic fluid at above the boiling point of sulphur, subjecting the unvaporized sulphur ore as a substantially stationary body, to streams of hot elastic fluid passing therethrough at above the boiling point of sulphur, and leading away the sulphur vapor and hot elastic fluid to a cooling system.

3. A process of separating sulphur from ore which comprises injecting sulphur ore, in a comminuted state, into a vaporization receptacle, by a current of superheated steam at above the boiling point of sulphur, and leading away the sulphur vapor and steam to a cooling system.

4. In the vaporization of sulphur from sulphur ores, the step of injecting sulphur ore, with superheated elastic fluid, at above the boiling point of sulphur, into a retort, whereby a substantial part of the sulphur content is vaporized.

5. A process of separating sulphur from sulphur ores which comprises blasting the pulverized sulphur ore into a chamber, by means of a superheated vapor supplied at a temperature above the boiling point of sulphur, allowing the non-vaporized portion of the ore to pile up and introducing further quantities of such superheated vapors substantially below the surface thereof, leading off the sulphur vapors and introduced vapors, and condensing the sulphur vapor.

6. In the heat treatment of material containing oxidizable constituents, the step of preventing the introduction of air into the treating receptacle which comprises blowing steam into the material to be treated just before the same is taken into the heat-treating system.

7. A process of distilling sulphur from sulphur-bearing material, which comprises injecting the said material into a distilling retort by means of a blast of a hot elastic fluid introduced at above the boiling point of sulphur, after substantially freeing said material from air, allowing the solid material in said retort to fall and pile up, injecting hot elastic fluid at above the vaporizing temperature of sulphur into the mass of solid material in said retort, leading away the sulphur vapor mixed with elastic fluid to a condenser for condensing the sulphur vapor.

8. A distilling apparatus which comprises a retort, an injector for blasting finely divided solid material thereinto, means for preliminarily freeing the said material from gases contained in the interstitial spaces thereof, means for treating the settled material in the retort with a hot elastic fluid, a condenser, a conduit for leading the vapors from said retort to said condenser and means for causing the vapors to flow through said conduit from the said retort to the said condenser.

In testimony whereof, I have hereunto subscribed my name.

JAMES T. FENTON.